(12) United States Patent
Nicholson et al.

(10) Patent No.: US 9,326,060 B2
(45) Date of Patent: Apr. 26, 2016

(54) BEAMFORMING IN VARYING SOUND PRESSURE LEVEL

(71) Applicant: Apple Inc., Cupertino, CA (US)

(72) Inventors: Guy C. Nicholson, Cupertino, CA (US); Wei Li, San Jose, CA (US)

(73) Assignee: Apple Inc., Cupertino, CA (US)

( * ) Notice: Subject to any disclaimer, the term of this patent is extended or adjusted under 35 U.S.C. 154(b) by 99 days.

(21) Appl. No.: 14/451,039

(22) Filed: Aug. 4, 2014

(65) Prior Publication Data

US 2016/0037255 A1 Feb. 4, 2016

(51) Int. Cl.
| | |
|---|---|
| H03G 3/20 | (2006.01) |
| H04R 1/40 | (2006.01) |
| H04R 3/00 | (2006.01) |
| H04R 1/02 | (2006.01) |
| H04N 9/79 | (2006.01) |

(52) U.S. Cl.
CPC .................. *H04R 1/406* (2013.01); *H04N 9/79* (2013.01); *H04R 1/028* (2013.01); *H04R 3/005* (2013.01); *H04R 2430/20* (2013.01); *H04R 2499/11* (2013.01)

(58) Field of Classification Search
CPC .................................. H03G 3/32; H03G 3/24
USPC ............................................................ 381/57
See application file for complete search history.

(56) References Cited

U.S. PATENT DOCUMENTS

| | | | |
|---|---|---|---|
| 2010/0202628 A1 | 8/2010 | Meyer et al. | |
| 2012/0114128 A1* | 5/2012 | Derkx ................... | H04R 3/005 381/56 |
| 2012/0114138 A1* | 5/2012 | Hyun .................... | H04R 3/005 381/92 |
| 2013/0258813 A1* | 10/2013 | Herre .................... | H04R 1/406 367/135 |
| 2013/0272096 A1 | 10/2013 | Pandharipande et al. | |
| 2014/0270245 A1* | 9/2014 | Elko ...................... | H04R 3/005 381/92 |
| 2014/0313859 A1* | 10/2014 | Hald .................... | G10K 11/346 367/138 |

FOREIGN PATENT DOCUMENTS

WO WO-2014085978 A1 6/2014

OTHER PUBLICATIONS

Cox, Henry, et al., "Robust Adaptive Beamforming", IEEE Transactions on Acoustics, Speech, and Signal Processing, vol. ASSP-35, No. 10, Oct. 1987, (pp. 1365-376).
Frost, III, Otis L., "An Algorithm for Linearly Constrained Adaptive Array Processing", Proceedings of the IEEE, vol. 60, No. 8, Aug. 1972, (pp. 926-935).

* cited by examiner

*Primary Examiner* — Simon King
(74) *Attorney, Agent, or Firm* — Blakely, Sokoloff, Taylor & Zafman LLP

(57) ABSTRACT

A method that uses a microphone array for spatially selective sound pickup during an audio-video recording session is described. An audio signal for the audio-video recording session is generated using a beamforming process from the microphone array in accordance with a sound pickup directivity pattern. Ambient sound pressure level of the audio-video recording session is monitored while generating the audio signal. The sound pickup directivity pattern of the beamforming process is automatically adjusted during the audio-video recording session as a function of the monitored ambient sound pressure level. Other embodiments are also described and claimed.

20 Claims, 10 Drawing Sheets

BEAMFORMING IN VARYING SOUND PRESSURE LEVEL

FIELD

An embodiment of the invention is related to real-time or live audio signal processing techniques during an audio & video recording session and, more specifically, to audio beamforming for producing the recorded audio of the session.

BACKGROUND

Many applications running on computing devices involve functionality that requires audio input. Under typical environmental conditions, a single microphone may do a poor job of capturing a sound of interest due to the presence of various background sounds. To address this issue, audio beamforming is often used to improve signal to noise ratio. Audio beamforming is a technique in which the signals of two or more microphones (i.e., a microphone array, in a generic sense) are combined to enable the preferential capture of sound coming from certain directions. A computing device that uses audio beamforming can include an array of two or more closely spaced, omnidirectional microphones linked to a processor. The processor can then process the signals captured by the different microphones to generate a single output that exhibits spatially selective sound pickup, to isolate a sound coming from a particular direction from background noise.

The audio beamforming process can be tuned to switch between several beamforming directivity patterns. The sound pickup directivity patterns can be fixed or adapted over time, and can even vary by frequency. However, the different directivity patterns achieve varying levels of success for different types of sound, which can lead to suboptimal results.

SUMMARY

An embodiment of the invention is a method that uses a microphone array for spatially selective sound pickup during an audio-video recording session. An audio signal for the audio-video recording session is generated using a beamforming process from the microphone array in accordance with a sound pickup directivity pattern. Ambient sound pressure level of the audio-video recording session is monitored while generating the audio signal. The sound pickup directivity pattern of the beamforming process is automatically adjusted during the audio-video recording session as a function of the monitored ambient sound pressure level. A low directivity pattern is used for the beamforming process when the monitored ambient sound pressure level is below a first sound level threshold and a high directivity pattern is used for the beamforming process when the monitored ambient sound pressure level is above a second sound level threshold.

In one embodiment, the first sound level threshold is the same as the second sound level threshold. In another embodiment, the first sound level threshold is lower than the second sound level threshold. In one embodiment, the low directivity pattern has a directivity index that is less than 4.8 dB and the high directivity pattern has a directivity index that is equal to or greater than 4.8 dB.

In one embodiment, white noise gain (WNG) of the beamforming process during the audio-video recording session is automatically adjusted as a function of the monitored ambient sound pressure level. A strict WNG constraint is used when the monitored ambient sound pressure level is below a third sound level threshold and a loose WNG constraint is used when the monitored ambient sound pressure level is above a fourth sound level threshold. In one embodiment, the third sound level threshold is the same as the fourth sound level threshold. In another embodiment, the third sound level threshold is lower than the fourth sound level threshold.

Another embodiment of the invention is a handheld device such as a smartphone that includes a camera which is to record video. The handheld device also includes a microphone array that is to capture audio. The handheld device also includes a sound level monitor that is to monitor ambient sound pressure level. The handheld device also includes an audio processor that is to generate, using a beamforming algorithm, an audio signal from the microphone array in accordance with a sound pickup directivity pattern. The audio processor also is to automatically adjust the sound pickup directivity pattern of the beamforming algorithm as a function of the monitored ambient sound pressure level.

In one embodiment, the audio processor adjusts the sound pickup directivity pattern by adjusting a directivity index (DI) based on the monitored ambient sound pressure level. In another embodiment, the audio processor automatically adjusts white noise gain (WNG) of the beamforming algorithm as a function of the monitored ambient sound pressure level.

The above summary does not include an exhaustive list of all aspects of the invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The present invention is illustrated by way of example and not limitation in the figures of the accompanying drawings in which like references indicate similar elements.

DETAILED DESCRIPTION

A method of automatically adjusting sound pickup directivity pattern of a video recording device based on the ambient sound pressure level during an audio-video recording session is described. In the following description, numerous specific details are set forth to provide thorough explanation of embodiments of the invention. It will be apparent, however, to one skilled in the art, that embodiments of the invention may be practiced without these specific details. In other instances, well-known components, structures, and techniques have not been shown in detail in order not to obscure the understanding of this description.

Reference in the Specification to "one embodiment" or "an embodiment" means that a particular feature, structure, or characteristic described in connection with the embodiment can be included in at least one embodiment of the invention. The appearances of the phrase "in one embodiment" in various places in the Specification do not necessarily all refer to the same embodiment.

Sound pressure is the local pressure deviation from the ambient atmospheric pressure caused by a sound wave. In air, sound pressure can be measured or detected using a microphone. Sound pressure level (SPL) or sound level is a detected measure of sound pressure, e.g. as a logarithmic measure of the effective sound pressure of a sound relative to a reference value, typically given in decibels (dB) above a standard reference level.

A microphone array is often used in handheld devices to achieve sound pickup with directional gain in a preferred spatial direction while suppressing pickup from another direction. A beamforming process processes individual microphone signals from the microphone array, and can be tuned to switch between several directivity patterns. Traditionally, the directivity is not automatically adjusted based on the ambient sound level during an audio-video recording session. In accordance with an embodiment of the invention, when the ambient sound level is low, a sound pickup directivity pattern with low directivity is found to be preferred in order to allow sound of a user talking at the "rear" of the beam to be captured. When the ambient sound level is high, e.g. during a loud concert, the recorded sound quality will improve if a more directive pattern is used, because recorded "room sound" will, in that case, be attenuated.

In one embodiment, the overall sound pressure level of the scene or environment is monitored during the audio-video recording session, and the beamforming directivity is adjusted as a function of the monitored sound pressure level. For example, when the sound pressure level is low, a low directivity pattern is used; when the sound pressure level is high, a high directivity (more directive) pattern is used.

Figure 1:
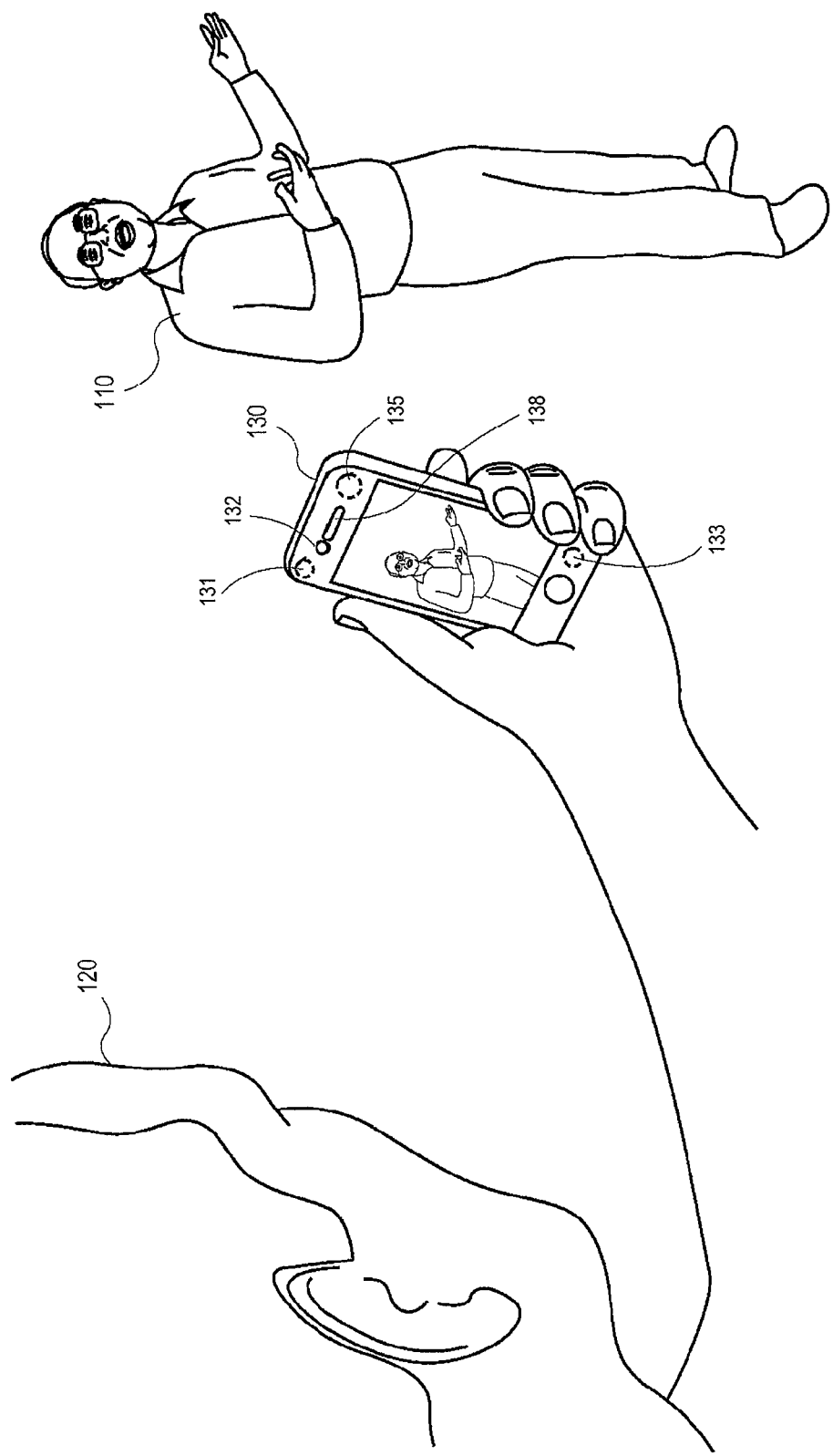
FIG. 1 illustrates a scenario of an audio-video recording session.

FIG. 1 illustrates a scenario of an audio-video recording session. Specifically, this figure shows that a user 120 is holding in his hand a video recording device 130 which is recording a video of the subject 110 while the subject is talking. In one embodiment, the video recording device 130 is a small, handheld computing device, such as a smartphone as shown in FIG. 1, a personal digital assistant (PDA), a tablet computer, or a camcorder; but it could alternatively be a wearable computing device (e.g., like a watch or a headset), a digital video camera, etc. The video recording device 130 has a microphone array that includes two or more microphones, e.g., microphones 131-133 in the case of the smartphone shown in FIG. 1. The video recording device 130 also includes a front-facing camera 135 that can record video of a scene that is considered to be in "front" of the camera 135 (here, the scene has the subject 110 in it). The video recording device 130 may also include an earpiece speaker (receiver) 138. During the audio-video recording session, the user 120 points the camera 135 of the video recording device 130 in the direction of the subject 110, which may be considered to be the 0-degree direction (or front center) of a sound pickup directivity pattern that will be described in FIG. 3 below. The user 120 is thus to the rear of, at the back of, or behind the video recording device 130, at about the 180-degree direction of the sound pickup directivity pattern.

Figure 2:
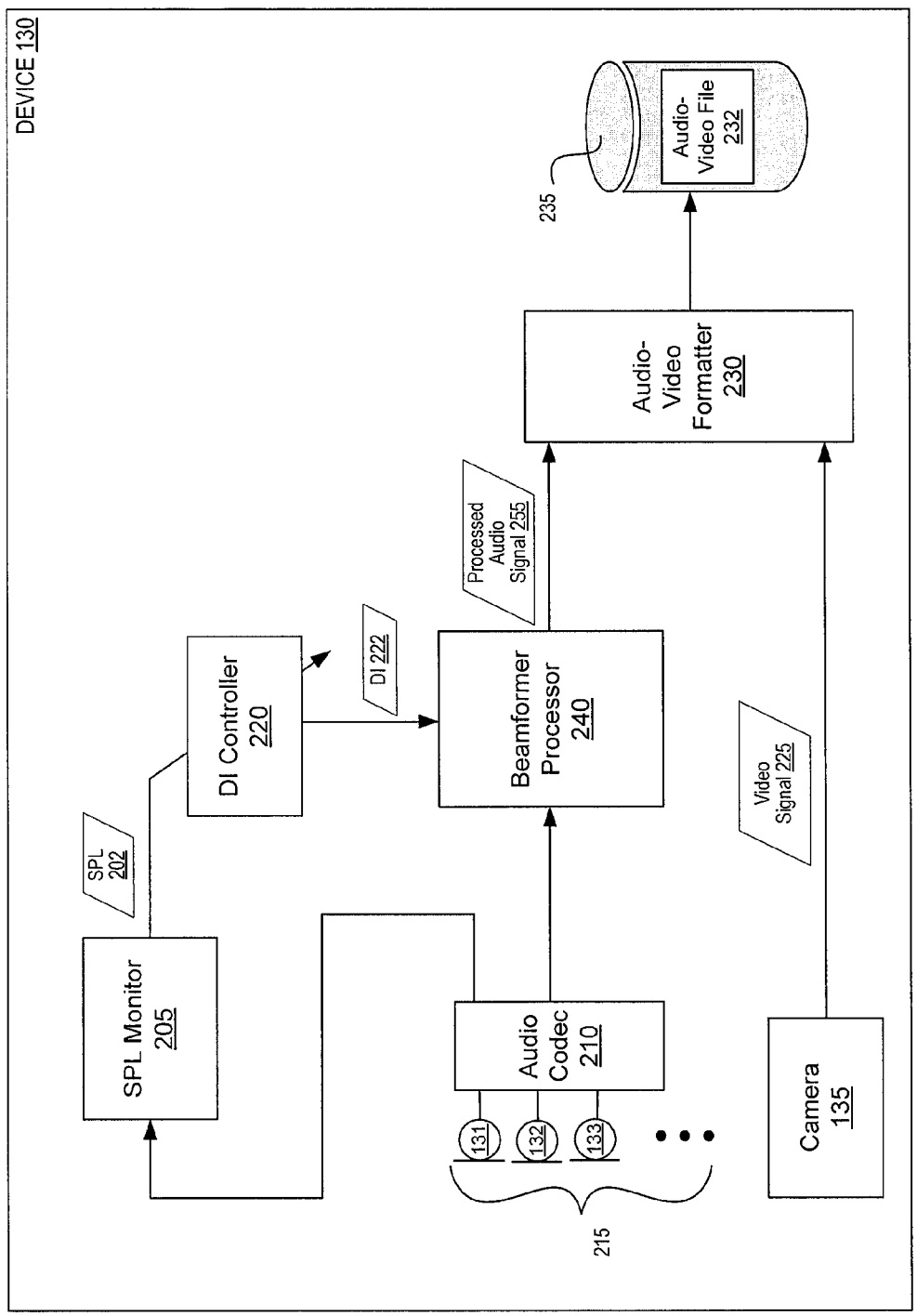
FIG. 2 illustrates a block diagram of the video recording device of one embodiment.

FIG. 2 illustrates a block diagram of relevant components of the video recording device 130 in accordance with one embodiment of the invention. In one embodiment, the video recording device 130 is used in an audio-video recording session as described in connection with FIG. 1 above. As illustrated in FIG. 2, the device 130 includes the camera 135, a microphone array 215 including in this case at least microphones 131, 132, 133, a SPL monitor 205, a DI controller 220, an audio codec 210, an audio-video formatter 230, storage 235, and a beamformer processor 240. In one embodiment, the audio codec 210, the DI controller 220 and the beamformer processor 240 are parts of an audio processor of the device 130.

The microphone array 215 includes two or more microphones, e.g. microphones 131 and 132 whose acoustic inputs "open" towards the front and rear, respectively. There may also be a third microphone 133 which in this case is the "talker" microphone of a smartphone handset. The microphone array 215 produces individual microphone (audio) signals that are processed by the audio codec 210 (e.g., analog to digital conversion). The audio codec 210 provides the individual microphone signals in digital form. The SPL monitor 205, using any suitable digital audio processing algorithm, computes a measure of the ambient sound pressure based on one or more of the digital microphone signals available from the audio codec 210, as a SPL value 202. In another embodiment, the SPL monitor 205 is part of the audio codec 210 and has an analog circuit that receives a signal directly from one or more of the microphones and produces an analog SPL signal (which may then be digitized into an SPL value 202).

The DI controller 220 receives the SPL value 202 and generates a DI value 222 based on the SPL value. In one embodiment, the DI controller 220 generates the DI value 222 by applying a function that will be described in FIG. 4 below.

The beamformer processor 240 performs audio beamforming on two or more microphone signals received from the audio codec 210. The sound pickup directivity pattern used by the beamformer processor 240 is determined by the DI value 222. The output of the beamformer processor 240 is a processed audio signal 255 that exhibits spatially selective sound pickup. The processed audio signal 255 is sent to one or more applications for further processing. In one embodiment, the audio-video formatter 230 combines the processed audio signal 255 and a video signal 225 produced by the camera 135 (maintains time synchronization between the audio signal 255 and the video signal 225) to generate an audio-video file 232 and stores the file at the storage 235. The audio-video file 232 can be a MPEG-4 (MP4) video, a M4V file, a QuickTime File Format file containing AAC encoded audio and H.264 encoded video, or other suitable file format. In one embodiment, the audio-video file 232 can be distributed across the Internet by the device 130.

The device 130 was described above for one embodiment of the invention. One of ordinary skill in the art will realize that in other embodiments, the device 130 can be implemented differently. For instance, certain modules or components of the device 130 are implemented as software that is being executed by an applications processor or a system on a chip (SoC). However, in another embodiment, some of the modules might be implemented by dedicated hardware, e.g. hardwired digital filter blocks, programmable logic integrated circuit devices, field programmable gate arrays, and application specific integrated circuits.

Figure 3:
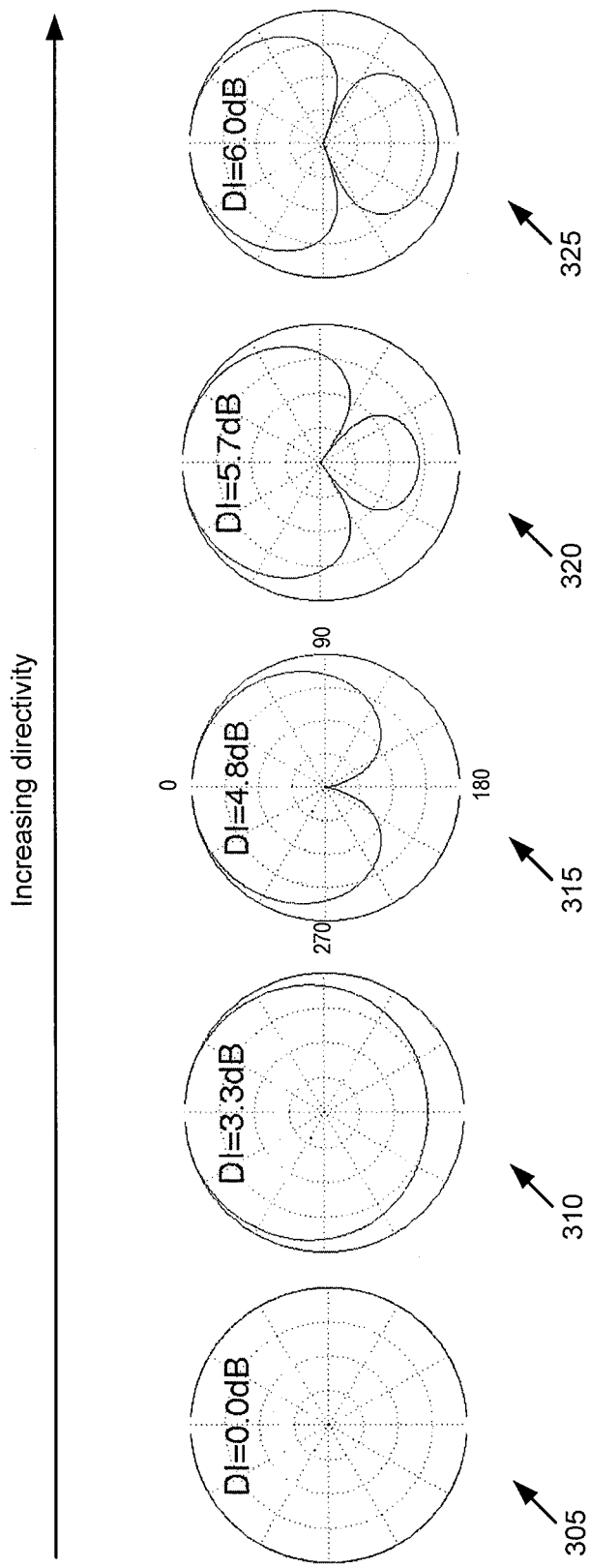
FIG. 3 illustrates several possible sound pickup directivity patterns.

Different sound pickup directivity patterns can be applied to a microphone array of a device to achieve optimal spatial selectivity. FIG. 3 illustrates several possible sound pickup directivity patterns. Specifically, this figure shows an omnidirectional pattern 305, a sub-cardioid pattern 310, a cardioid pattern 315, a super-cardioid pattern 320, and a hyper-cardioid pattern 325. These sound pickup directivity patterns are shown from left to right with increasing directivity, i.e. with increasing directivity index (DI) value. One of ordinary kill in the art would realize these are just some examples of possible directivity patterns, and there could be other directivity patterns with different DI values.

In each of the drawings for the directivity patterns 305-325, the outer ring represents the gain at each beam direction for an omnidirectional microphone. The inner contour represents the directivity pattern, or the gain at each direction when the corresponding sound pickup directivity pattern is applied. The center point represents where the device with the microphone array (e.g., device 130 of FIG. 1) is located. For example, the inner contour of the drawing for the omnidirectional pattern 305 is the same as its outer ring. This represents the gain for an omnidirectional microphone when the directivity pattern 305 is applied. The cardioid pattern 315 illustrates that this pattern can be used to reduce noise coming from back beams, e.g. noise coming from the "rear", or 90-270 degrees directions, and to reduce the gain at the 180-degree direction to null.

For a given beamformer configuration, the sound pickup directivity pattern can change depending on frequency content of the picked up sound. For example, the pattern can shift from a sub-cardioid 310 to a cardioid 315 across different frequencies. In one embodiment, a microphone array beamformer running in a smartphone is more directive at higher audio frequencies than at lower frequencies.

When using a low directivity pattern (e.g., the sub-cardioid pattern 310) to record a movie in an environment with high SPL (e.g., a music concert), the video recording device captures more "room sound" than desirable, because of the low directivity tuning. However, in an environment with low SPL (e.g., less than 90 dB), a low directivity pattern (e.g., the sub-cardioid pattern 310) can be used to better capture the user's speech which originates behind the device, even whilst the device is being moved up and down for example (See FIG. 1). The low directivity pattern can also attenuate the user's speech to a certain degree so that the user's speech will not dominate the recorded audio signal. Accordingly, a low directivity patterns should be used (in a movie recording session) when the SPL is low.

In an environment with high SPL, such as a loud concert, the captured sound quality will improve if a more directive pattern (e.g., the super-cardioid pattern 320 or the hyper-cardioid pattern 325) is used during the audio-video recording session, because the room sound will be attenuated. Here the user's speech is masked by the loud ambient noise and becomes less of a concern to the recording session. The further attenuation of the user's speech due to a high directivity pattern can, in this case, be tolerated. Accordingly, a high directivity patterns should be used (during a movie recording session as depicted for example in FIG. 1) when the SPL is high.

Figure 4:
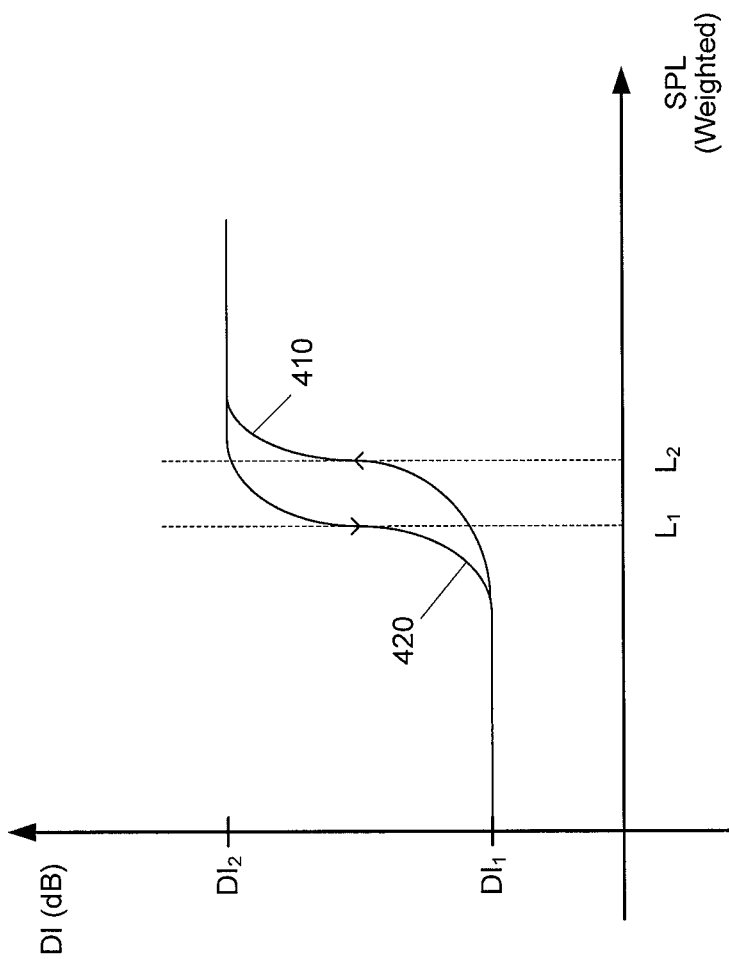
FIG. 4 illustrates an example of varying sound pickup directivity of the beamformer as a function of the monitored ambient sound pressure level.

FIG. 4 illustrates an example of varying sound pickup directivity of the beamformer as a function of the monitored ambient sound pressure level. Specifically, this figure shows adjusting the DI parameter of the beamformer as a function of SPL. In one embodiment, this function is employed to adjust sound pickup directivity pattern of the beamforming process during the audio-video recording session described in FIG. 1 above. As illustrated in FIG. 4, when the SPL is low (less than $L_2$, which is e.g., 95 dB), the DI of the beamformer is set to $DI_1$, which may be a sub-cardioid pattern that has a DI of, e.g. 3.3 dB. When the SPL exceeds $L_2$, the value of DI is transitioned to $DI_2$ (as illustrated by curve 410), which represents a more directive pattern (e.g., cardioid pattern with DI of 4.8 dB, super-cardioid pattern with DI of 5.7 dB, and hyper-cardioid pattern with DI of 6.0 dB). Conversely, when the SPL is high (more than $L_1$, which is e.g., 90 dB), the value of DI is set to $DI_2$. When the SPL drops to lower than $L_1$, the DI of the beamformer is transitioned (reduced) to $DI_1$, as illustrated by curve 420.

As illustrated in FIG. 4, the relationship between SPL and DI may employ hysteresis to avoid frequent transitions between the two DI states. In one embodiment, $L_1$, $L_2$, $DI_1$, and $DI_2$ are all software or hardware tunable parameters. In one embodiment, the hysteresis can include interim DI values between $DI_1$ and $DI_2$ for given interim values between $L_1$ and $L_2$. A person of ordinary skill in the art would recognize that, in one embodiment, the relationship between SPL and DI may not employ hysteresis, where in that case $L_1$ and $L_2$ would be the same value.

Figure 5:
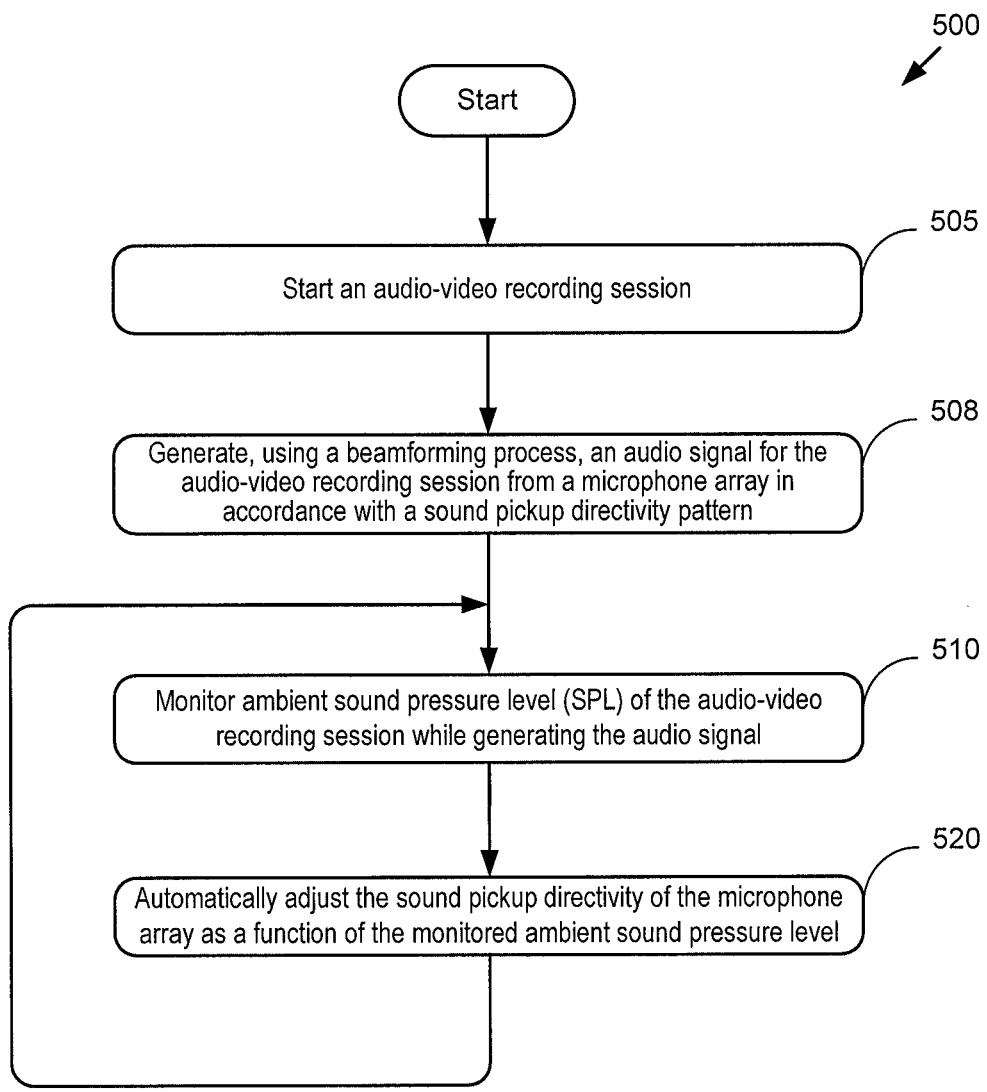
FIG. 5 illustrates a flowchart of one embodiment of operations performed by a video recording device.

FIG. 5 illustrates a flowchart of one embodiment of operations performed by a video recording device, referred to as process 500. In one embodiment, the device (e.g., video recording device 130 of FIG. 1) executes process 500 when recording a movie. Process 500 begins by starting (at block 505) an audio-video recording session where a camera is operating to produce a video signal.

At block 508, process 500 generates, using a sound pickup beamforming process, an audio signal for the audio-video recording session from a microphone array (e.g., the microphone array 215 of FIG. 2) in accordance with a sound pickup directivity pattern. At block 510, process 500 monitors ambient sound pressure level (SPL) of the audio-video recording session while generating the audio signal in block 508. In one embodiment, the ambient sound pressure level of the audio-video recording session is the SPL of the environmental or ambient sound during the audio-video recording session.

Process 500 automatically adjusts (at block 520) the sound pickup directivity of the beamforming process as a function of the monitored ambient sound pressure level. In one embodiment, process 500 adjusts sound pickup directivity pattern of the beamforming process according to the function described in FIG. 4 above. Process 500 then loops back to block 510 to continue monitoring the ambient sound pressure level. In one embodiment, process 500 ends when the device is turned off or the device receives a command to stop recording the movie.

One of ordinary skill in the art will recognize that process 500 is a conceptual representation of the operations executed by a device to adjust sound pickup directivity pattern of the beamformer when recording a video. The specific operations of process 500 may or may not be performed in the exact order shown and described. The specific operations may or may not be performed in one continuous series of operations, and different groups of the specific operations may be performed in different embodiments. Furthermore, process 500 could be implemented using several sub-processes, or as part of a larger macro process.

In a practical implementation, system noise is generated in the microphone components and in an audio codec chip, that can mask a differential audio beamformed signal of interest, as function of frequency and microphone spacing. A metric known as White Noise Gain (WNG) can be computed that measures the degradation caused by the system noise introduced by the beamformer. At low frequency, there is a tradeoff between DI and WNG. For example, higher DI comes with worse WNG which brings up system noise. Therefore, in one embodiment, DI is fixed low at low frequency to reduce system noise resulting in less directivity.

Figure 6:
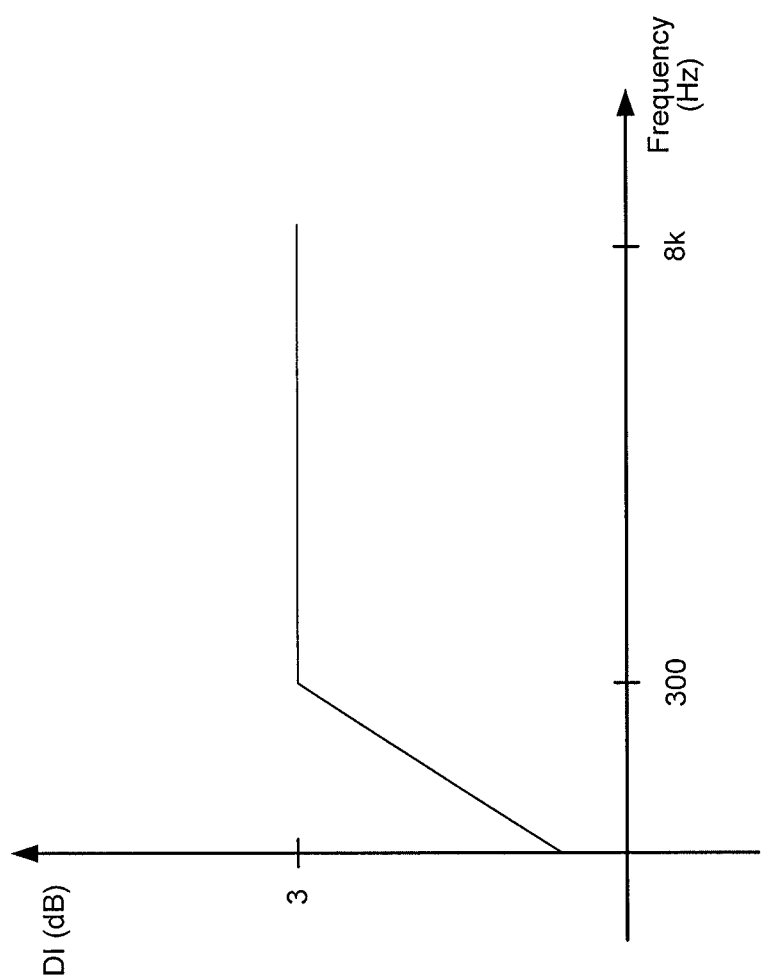
FIG. 6 illustrates an example of setting directivity index of a beamforming process as a function of frequency.

FIG. 6 illustrates an example of setting DI of a beamforming process as a function of frequency. As illustrated in the figure, when the frequency of the audio signal is lower than 300 Hz, the DI of the beamforming process is set at lower values compared to when the frequency is higher than 300 Hz. This ensures strict WNG constraint so as to lower the audible system noise.

Figure 7:
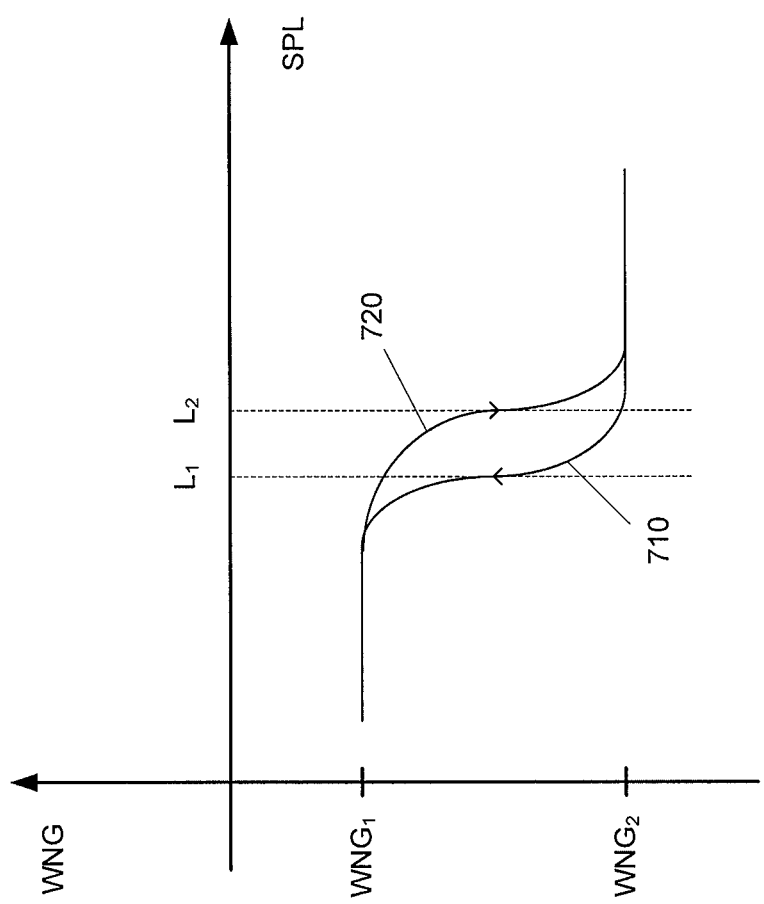
FIG. 7 illustrates an example of varying White Noise Gain of an audio beamforming process as a function of the monitored ambient sound pressure level.

FIG. 7 illustrates an example of varying WNG of a beamformer as a function of the monitored ambient sound pressure level. Specifically, this figure shows adjusting the WNG parameter of the beamformer as a function of SPL. In one embodiment, this function is employed to adjust sound pickup directivity pattern of the beamforming process during the audio-video recording session described in FIG. 1 above.

As illustrated in FIG. 7, when the SPL is low (less than $L_2$, which is e.g., 95 dB), the WNG is set to $WNG_1$, which is e.g., −10 dB. $WNG_1$ represents a "strict" WNG constraint that can lower the audible system noise. When the SPL exceeds $L_2$, the value of WNG is transitioned to $WNG_2$ (as illustrated by curve 720), which represents a "loose" WNG constraint (e.g., WNG of −50 dB). A loose WNG constraint will create more directivity on the subject 110 (see FIG. 1) and exclude the ambient sound. System noise will be high but it will be masked by higher SPL. Thus, user experience is not affected by the system noise in this high SPL environment. Conversely, when the SPL is high (more than $L_1$, which is e.g., 90 dB), the value of WNG is set to $WNG_2$. When the SPL drops to lower than $L_1$, the value of WNG is transitioned back up to $WNG_1$, as illustrated by curve 710.

As illustrated in FIG. 7, the relationship between SPL and WNG employs hysteresis to avoid frequent transitions between the two states of WNG. In one embodiment, $L_1$, $L_2$, $WNG_1$, and $WNG_2$ are all software or hardware tunable parameters. In one embodiment, the hysteresis can include interim WNG values between $WNG_1$ and $WNG_2$ for given interim values between $L_1$ and $L_2$. A person of ordinary skill in the art would recognize that, in one embodiment, the relationship between SPL and WNG may not employ hysteresis, such that $L_1$ and $L_2$ are the same value.

Figure 8:
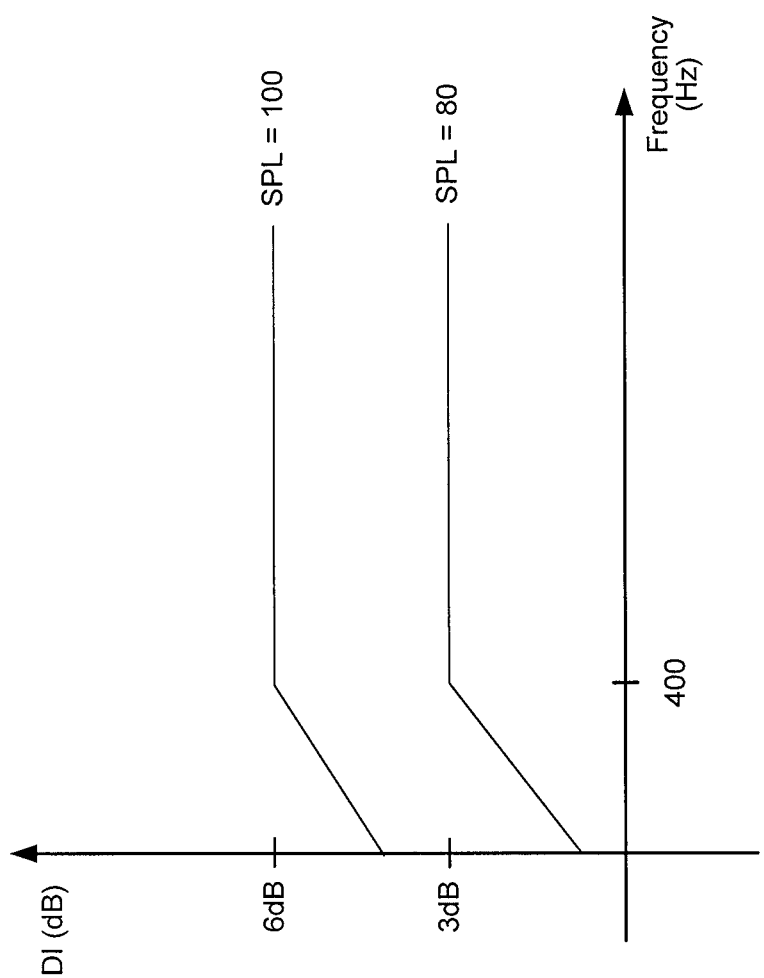
FIG. 8 illustrates an example of sound pickup directivity patterns across frequency for different sound pressure level.

FIG. 8 illustrates an example of sound pickup directivity patterns across frequency for different SPL. Specifically, this figure shows different DI values across frequency for different SPL. As illustrated, at high SPL, e.g. SPL of 100 dB, the DI value for the low frequency band (e.g., frequency <400 Hz) is increased compared with the low SPL situation, e.g. SPL of 80 dB. This increase of DI at high SPL is due to the use of a looser WNG constraint, as discussed in FIG. 7 above.

Figure 9:
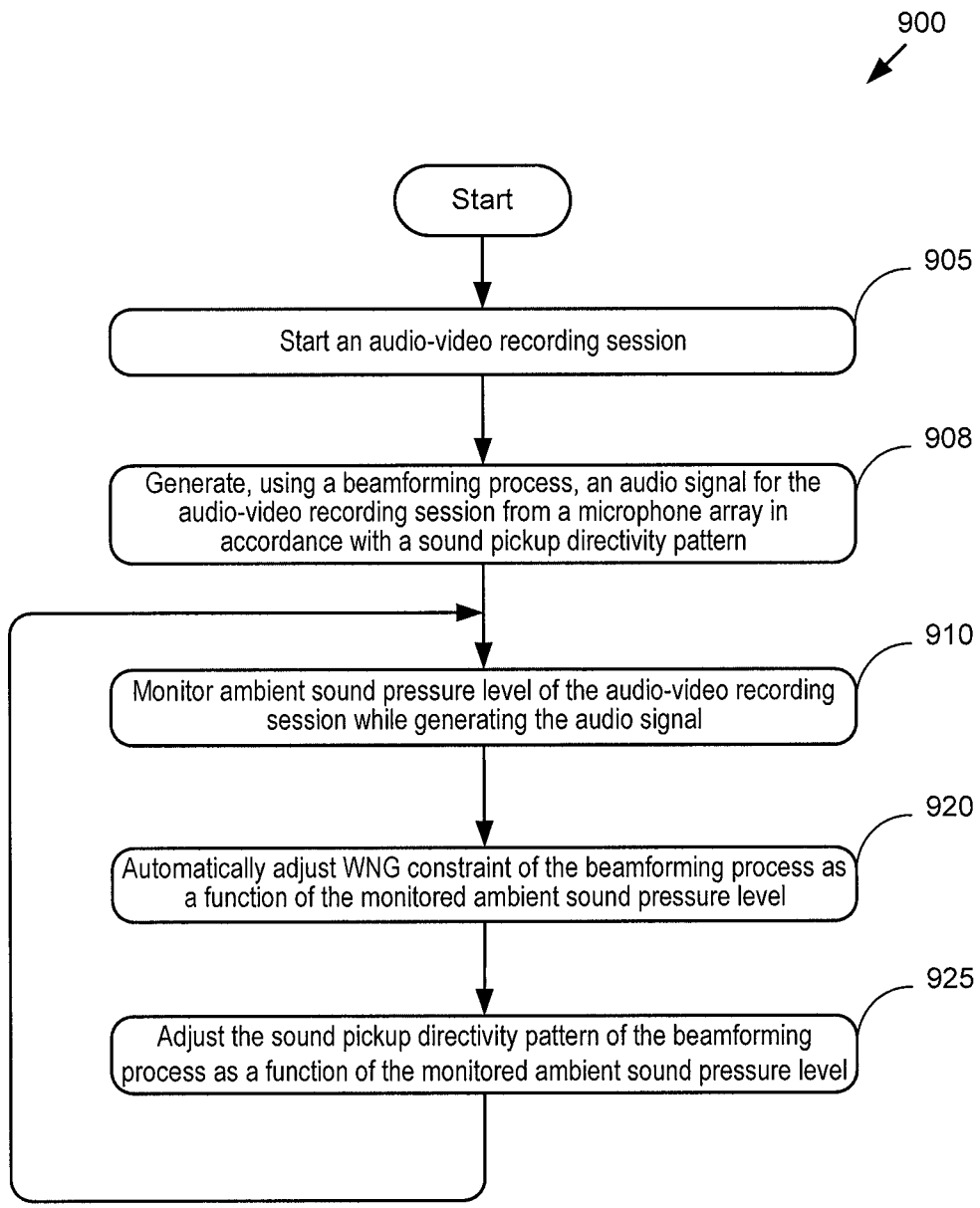
FIG. 9 illustrates a flowchart of another embodiment of operations performed by a video recording device.

FIG. 9 illustrates a flowchart of another embodiment of operations performed by a video recording device, referred to as process 900. In one embodiment, the device (e.g., video recording device 130 of FIG. 1) executes process 900 when recording a movie. Process 900 begins by starting (at block 905) an audio-video recording session where a camera is operating to produce a video signal.

At block 908, process 900 generates, using a sound pickup beamforming process, an audio signal for the audio-video recording session from a microphone array (e.g., the microphone array 215 of FIG. 2) in accordance with a sound pickup directivity pattern. At block 910, process 900 monitors ambient sound pressure level of the audio-video recording session while generating the audio signal in block 908. In one embodiment, the ambient sound pressure level of the audio-video recording session is the SPL of the environmental or ambient sound during the audio-video recording session.

Process 900 automatically adjusts (at block 920) WNG constraint of the beamforming process as a function of the monitored ambient sound pressure level. In one embodiment, process 900 adjusts WNG according to the function described in FIG. 7 above.

At block 925, process 900 automatically adjusts the sound pickup directivity pattern of the beamforming process as a function of the monitored ambient sound pressure level. In one embodiment, process 900 adjusts the sound pickup directivity pattern of the beamforming process according to the function described in FIG. 4 above.

Process 900 then loops back to block 910 to continue monitoring the ambient sound pressure level. In one embodiment, process 900 ends when the device is turned off or the device receives a command to stop recording the movie.

One of ordinary skill in the art will recognize that process 900 is a conceptual representation of the operations executed by a device to adjust the sound pickup directivity pattern of the beamformer when recording a video. The specific operations of process 900 may or may not be performed in the exact order shown and described. For example and in one embodiment, operations in blocks 920 and 925 can be performed in reversed order or in parallel. The specific operations may or may not be performed in one continuous series of operations, and different groups of the specific operations may be performed in different embodiments. Furthermore, process 900 could be implemented using several sub-processes, or as part of a larger macro process.

Figure 10:
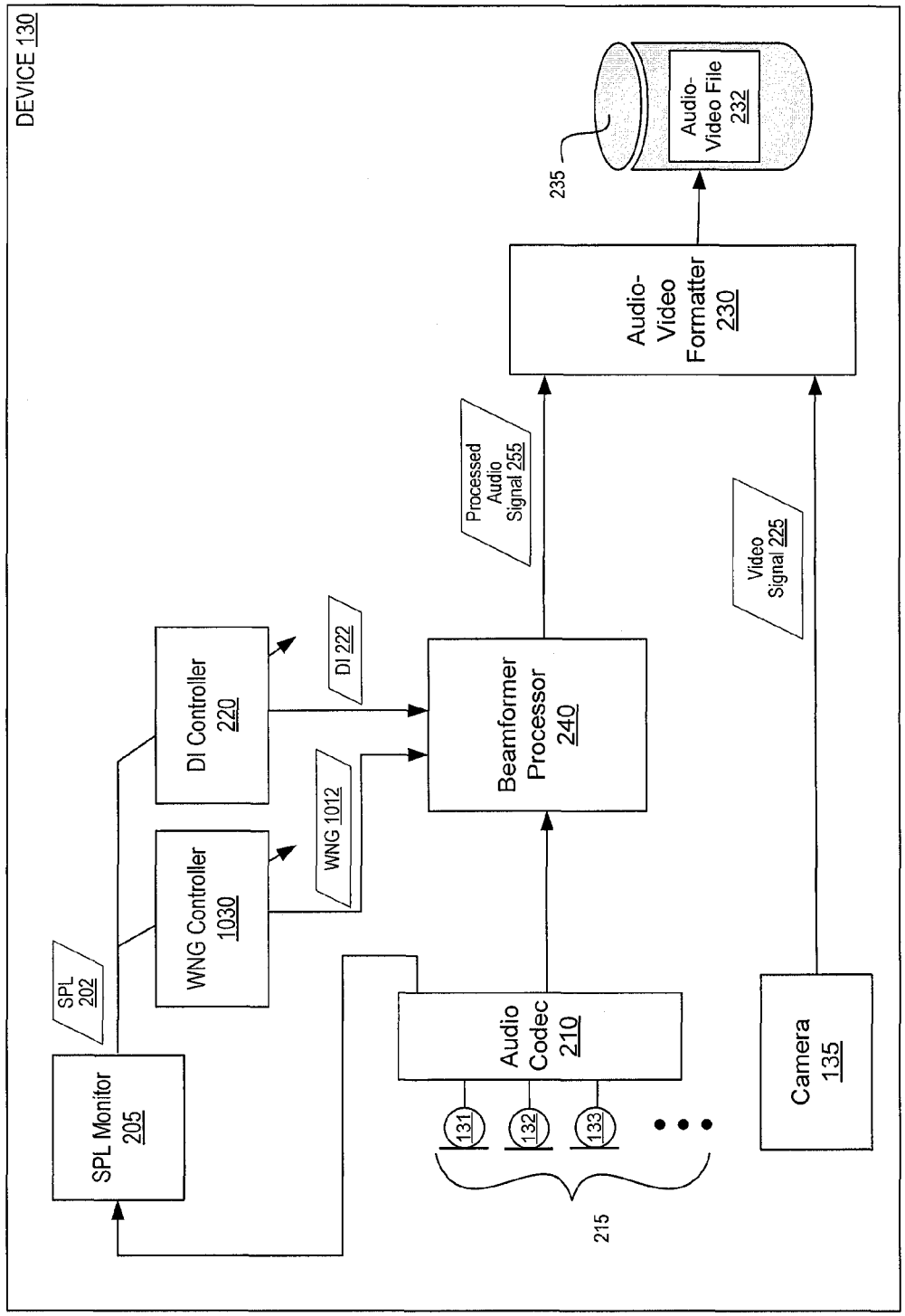
FIG. 10 illustrates a block diagram of a video recording device of another embodiment.

FIG. 10 illustrates a block diagram of a video recording device 130 of another embodiment. In one embodiment, the video recording device 130 is used in the audio-video recording session described in FIG. 1 above. As illustrated in FIG. 10, the device 130 includes a camera 135, an audio-video formatter 230, storage 235, an audio codec 210, a microphone array 215, a SPL monitor 205, a WNG controller 1030, a DI controller 220, and a beamformer processor 240. In one embodiment, the audio codec 210, the WNG controller 1030, the DI controller 220, and the beamformer processor 240 are parts of an audio processor of the device 130.

The microphone array 215 includes two or more microphones, e.g. microphones 131 and 132 whose acoustic inputs "open" towards the front and rear, respectively. There may also be a third microphone 133 which in this case is the "talker" microphone of a smartphone handset. The microphone array 215 produces individual microphone (audio) signals that are processed by the audio codec 210 (e.g., analog to digital conversion). The audio codec 210 provides the individual microphone signals in digital form. The SPL monitor 205, using any suitable digital audio processing algorithm, computes a measure of the ambient sound pressure based on one or more of the digital microphone signals available from the audio codec 210, as a SPL value 202. In another embodiment, the SPL monitor 205 is part of the audio codec 210 and has an analog circuit that receives a signal directly from one or more of the microphones and produces an analog SPL signal (which may then be digitized into an SPL value 202). The SPL value 202, which is sent to the WNG controller 1030 and the DI controller 220.

The DI controller 220 receives the SPL value 202 and generates a DI value 222 based on the SPL value. In one embodiment, the DI controller 220 generates the DI value 222 by applying the function described in FIG. 4 above. The WNG controller 1030 receives the SPL value 202 and generates a WNG value 1012 based on the SPL value. In one embodiment, the WNG controller 1030 generates the WNG value 1012 by applying the function described in FIG. 7 above.

The beamformer processor 240 performs audio beamforming on two or more microphone signals received from the audio codec 210. The sound pickup directivity pattern used by the beamformer processor 240 is determined by DI value 222. The WNG constraint used by the beamformer processor 240 is determined by the WNG value 1012.

The output of the beamformer processor 240 is processed audio signal 255. The processed audio signal 255 is sent to one or more applications for further processing. In one embodiment, the audio-video formatter 230 combines the processed audio signal 255 and a video signal 225 produced by the camera 135 (maintains time synchronization between the audio signal 255 and the video signal 225) to generate an audio-video file 232 and stores the file at the storage 235. The audio-video file 232 can be a MPEG-4 (MP4) video, a M4V file, a QuickTime File Format file containing AAC encoded audio and H.264 encoded video, or other suitable file format. In one embodiment, the audio-video file 232 can be distributed across the Internet by the device 130.

The device 130 was described above for one embodiment of the invention. One of ordinary skill in the art will realize that in other embodiments, the device 130 can be implemented differently. For instance, certain modules or components of the device 130 are implemented as software that is being executed by an applications processor or a system on a chip (SoC). However, in another embodiment, some of the modules might be implemented by dedicated hardware, e.g. hardwired digital filter blocks, programmable logic integrated circuit devices, field programmable gate arrays, and application specific integrated circuits.

The foregoing discussion merely describes some exemplary embodiments of the invention. One skilled in the art will readily recognize from such discussion, from the accompanying drawings, and from the claims that various modifications can be made without departing from the spirit and scope of the invention.

What is claimed is:

1. A method of using a microphone array for spatially selective sound pickup during an audio-video recording session, the method comprising:
    generating, using a beamforming process, an audio signal for the audio-video recording session from the microphone array in accordance with a sound pickup directivity pattern;
    monitoring ambient sound pressure level of the audio-video recording session while generating the audio signal; and
    automatically adjusting the sound pickup directivity pattern of the beamforming process during the audio-video recording session as a function of the monitored ambient sound pressure level.

2. The method of claim 1, wherein a low directivity pattern is used for the beamforming process when the monitored ambient sound pressure level is below a first sound level threshold and a high directivity pattern is used for the beamforming process when the monitored ambient sound pressure level is above a second sound level threshold.

3. The method of claim 2, wherein the first sound level threshold is the same as the second sound level threshold.

4. The method of claim 2, wherein the first sound level threshold is lower than the second sound level threshold.

5. The method of claim 2, wherein the low directivity pattern has a directivity index that is less than 4.8 dB.

6. The method of claim 5, wherein the high directivity pattern has a directivity index that is equal to or greater than 4.8 dB.

7. The method of claim 2, wherein the low directivity pattern is omnidirectional or sub-cardioid, and the high directivity pattern is a cardioid, super-cardioid, or hyper-cardioid.

8. The method of claim 1 further comprising automatically adjusting white noise gain (WNG) of the beamforming process during the audio-video recording session as a function of the monitored ambient sound pressure level.

9. The method of claim 8, wherein a strict WNG constraint is used when the monitored ambient sound pressure level is below a third sound level threshold and a loose WNG constraint is used when the monitored ambient sound pressure level is above a fourth sound level threshold.

10. The method of claim 9, wherein the third sound level threshold is lower than the fourth sound level threshold.

11. The method of claim 1, wherein the function maps higher ambient sound pressure levels to higher directivity indexes for the sound pickup directivity pattern of the beamforming process.

12. A handheld device comprising:
    a camera that is to record video;
    a microphone array that is to capture audio;
    a sound level monitor that is to monitor ambient sound pressure level; and
    an audio processor that is to generate, using a beamforming process, an audio signal from the microphone array in accordance with a sound pickup directivity pattern, and to automatically adjust the sound pickup directivity pattern of the beamforming process as a function of the monitored ambient sound pressure level.

13. The handheld device of claim 12, wherein the audio processor adjusts the sound pickup directivity pattern of the beamforming process by adjusting a directivity index of the sound pickup directivity pattern based on the monitored ambient sound pressure level.

14. The handheld device of claim 12, wherein a low directivity pattern is used for the beamforming process when the monitored ambient sound pressure level is below a first sound level threshold and a high directivity pattern is used for the beamforming process when the monitored ambient sound pressure level is above a second sound level threshold.

15. The handheld device of claim 14, wherein the audio processor further is to automatically adjust white noise gain (WNG) of the beamforming process as a function of the monitored ambient sound pressure level.

16. The handheld device of claim 15, wherein a strict WNG constraint is used when the monitored ambient sound pressure level is below a third sound level threshold and a loose WNG constraint is used when the monitored ambient sound pressure level is above a fourth sound level threshold.

17. A method of using a microphone array for spatially selective sound pickup during an audio-video recording session, the method comprising:
    generating, using a beamforming process, an audio signal for the audio-video recording session from the microphone array in accordance with a sound pickup directivity pattern;
    monitoring ambient sound pressure level of the audio-video recording session while generating the audio signal; and
    automatically adjusting white noise gain (WNG) of the beamforming process as a function of the monitored ambient sound pressure level.

18. The method of claim 17, wherein a strict WNG constraint is used when the monitored ambient sound pressure level is below a first sound level threshold and a loose WNG constraint is used when the monitored ambient sound pressure level is above a second sound level threshold.

19. The method of claim 18, wherein the first sound level threshold is the same as the second sound level threshold.

20. The method of claim 18, wherein the first sound level threshold is lower than the second sound level threshold.

* * * * *